Aug. 30, 1966          G. C. ROGERS          3,269,458

METHOD AND APPARATUS FOR ACCURATE AND CONTROLLED COOLING

Filed Oct. 14, 1963          2 Sheets-Sheet 1

INVENTOR.
GAIL C. ROGERS

BY

ATTORNEY

Aug. 30, 1966   G. C. ROGERS   3,269,458
METHOD AND APPARATUS FOR ACCURATE AND CONTROLLED COOLING
Filed Oct. 14, 1963   2 Sheets-Sheet 2
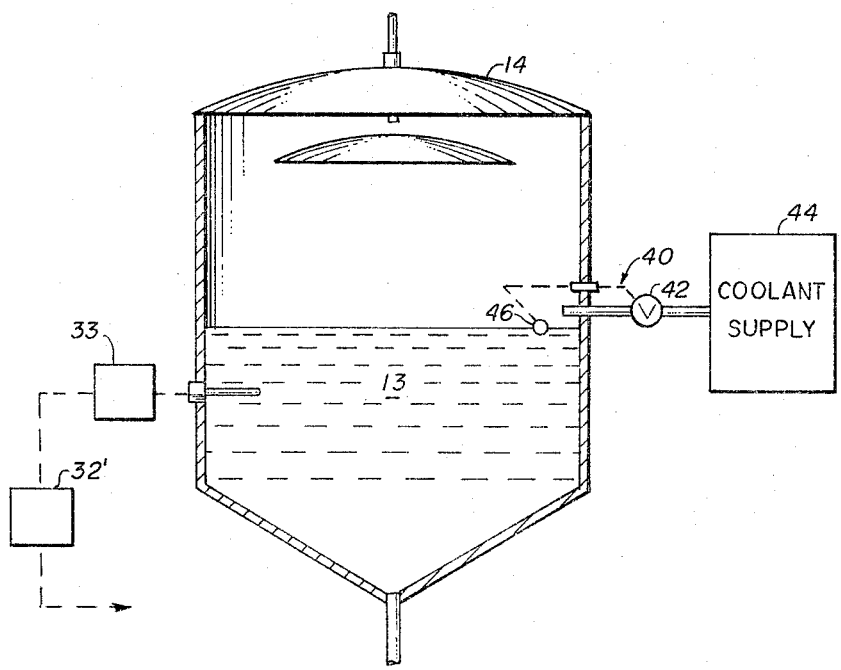
INVENTOR.
GAIL C. ROGERS
ATTORNEY United States Patent Office 3,269,458
Patented August 30, 1966

3,269,458
METHOD AND APPARATUS FOR ACCURATE AND CONTROLLED COOLING
Gail C. Rogers, Los Altos, Calif., assignor to the United States of America as represented by the United States Atomic Energy Commission
Filed Oct. 14, 1963, Ser. No. 316,194
10 Claims. (Cl. 165—2)

The invention disclosed herein was made under, or in the course of Contract No. AT(04-3)-363 with the United States Atomic Energy Commission.

The present invention relates generally to coolant temperature control systems and particularly to a method and apparatus for accurately controlling the temperature of a coolant fluid, which is utilized in turn to control the temperature of a heat load, such as for example, the disk-loaded waveguide of a linear accelerator.

There are various known methods and apparatus which may be utilized to lower and thereby control the operating temperature of a piece of equipment. An ordinary way of so doing is to circulate a coolant fluid into contact with the particular equipment, and to then pass the heated coolant fluid through a heat exchanger wherein the fluid is cooled by the direct or indirect contact with a lower-temperature fluid within the exchanger. When utilizing such a scheme a fairly accurate temperature control can be obtained by installing controls on one or both sides of the heat exchanger, or by placing a three-way mixing valve in the coolant fluid line to selectively by-pass part of the coolant as desired around the exchanger.

Other methods of temperature control require the use of mixing valves for combining hot and cold water, or steam and cold water, or require special systems where the object or equipment to be cooled is immersed in a bath of condensing steam or other vapor. All of the above-noted temperature control systems require rather specialized and complex coolant mixing valves and associated controls.

In general, the conventional heat exchanger type of cooling system operates on the theory of combining two streams of coolant of different temperatures and in the requisite proportions to obtain the desired coolant regulating temperature. Furthermore, such systems require the addition of extensive auxiliary apparatus and/or chemical additives to prevent the corrosive effects attributable to the presence of carbon dioxide, oxygen, and other dissolved gases in the coolant. Thus, the auxiliary apparatus necessary to prevent corrosive effects when combined with the additional apparatus required to provide a conventional cooling system with a high degree of accuracy, results in a highly complex and expensive cooling system. The installation and maintenance of such a complex system in turn requires rather specialized and therefore expensive installation technicians and maintenance men. In particular, therefore, it is difficult to design a heat exchanger type of cooling system which is of simple, unencumbered design, and which can provide the extremely high degree of accuracy essential for the requisite temperature control of, for example, a disk-loaded waveguide structure.

The present invention overcomes the above-noted shortcomings of prior art cooling systems by providing a relatively simple method and apparatus for regulating the temperature of an object with an unusual degree of accuracy, speed and efficiency, with a minimum of auxiliary equipment and maintenance.

Accordingly, it is an object of the present invention to provide a method and apparatus for accurately controlling the temperature of an object, wherein the object temperature varies relatively rapidly.

It is another object of the present invention to provide a temperature control method and apparatus capable of regulating the temperature of an object over a relatively wide range of temperatures and within very close tolerances, such as, for example, 0.1° to 0.2° F., for a given temperature.

It is yet another object of the present invention to provide a temperature control method and apparatus which operates on the pressure-volume-temperature (PVT) relationship of pure water.

It is a further object of the present invention to provide a method and apparatus for regulating the temperature of an object by circulating a coolant therethrough wherein the temperature of the coolant is controlled utilizing only a single stream of coolant, rather than by blending several streams of hot and cold coolant to the desired proportions.

It is still another object of the present invention to provide a temperature control system wherein corrosion effects are inherently reduced to a minimum.

Yet another object of the present invention is to provide a coolant temperature control method and apparatus utilizing a vapor condensing mechanism wherein the amount of vapor produced depends only on the amount of heat to be dissipated from the heat load and not on the amount of coolant circulated through the heat load.

Still another object of the present invention is to provide a coolant temperature control method and apparatus capable of providing a wide range of coolant flow rates with a minimum of equipment replacement.

It is another object of the present invention to provide a coolant temperature control method and apparatus capable of regulating the temperature of an object in the cryogenic temperature region as well as in the temperature region of hundreds of degrees centigrade with a minimum of apparatus changes.

Other objects and advantages of the invention will become apparent in the following description and claims taken in conjunction with the accompanying drawing, of which:

FIGURE 3 is a partial schematic diagram depicting various alternative apparatus which may be utilized in conjunction with the invention of FIGURES 1 and/or 2.

Briefly, the apparatus herein depicting the method of the present invention comprises basically a holding vessel maintained at a controlled low pressure, a vacuum pump for maintaining the low pressure, a coolant pump for circulating the coolant water throughout the system, an absolute pressure control apparatus to sense and control the pressure within the holding vessel, and a steam condenser. In operation, water at the desired controlled temperature is pumped to the heat load, wherein heat generated by the load is transferred to the water. The returning hot water is flash-cooled in the holding vessel which is maintained at the proper absolute pressure (controlled to within ±¼ mm. Hg). The heat realized by flash-cooling the hot water generates steam which is condensed in the steam condenser and returned to the holding vessel. The water in the holding vessel is thus maintained at the desired controlled temperature. It may be seen that the vessel is partially filled with coolant fluid in substantially liquid state, and the remainder of the vessel is filled with vapor of the coolant fluid. Likewise, the volume of coolant substitution is maintained at a substantially constant value whether simply by returning the condensed coolant as in a closed cycle system, or by adding additional coolant as in the system wherein the heated coolant is vented to the atmosphere.

It is to be understood that although the present method and apparatus is herein particularly described utilizing water as the coolant, any desired fluid may be used in lieu thereof. The general requisites for a useful coolant are that the fluid is capable of being boiled, and that it has a controllable vapor pressure. For example, among useful coolant fluids there are, liquid nitrogen, helium, "Dowtherm" (i.e. a eutectic mixture of phenyl ether and diphenyl), ammonia, dichlorodifluormethane, and mercury. The type and design of the above-mentioned apparatus are thus determined by, and adapted to, the type of coolant fluid used. For example, when utilizing liquid nitrogen or helium as the coolant, the heat absorbed by the coolant from the heat load would not be dissipated by means of a vapor condenser, but instead, either by simply venting the coolant to the atmosphere through a suitable control valve to thus dissipate the heat collected, or by passing the returning heated coolant through a compressor system and cooling it in liquid form. Since liquid nitrogen is relatively inexpensive it would preferably be vented to air to save the expense of compressors, etc. However, helium is relatively expensive and its use as a coolant in the invention would thus usually necessitate utilizing a reliquefaction system as a means for dissipating the heat in the returning coolant. Thus it may be seen that the exact type of apparatus employed in the invention is dependent upon the coolant used, which in turn, depends upon the desired range of operating temperature of the head load.

Figure 1:
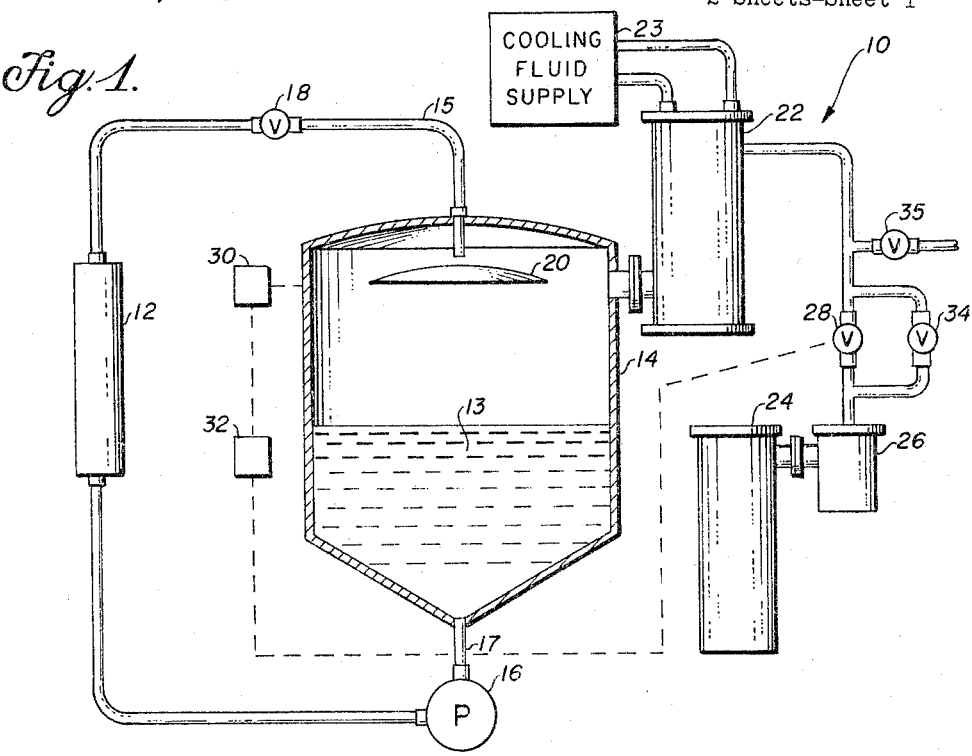
FIGURE 1 is a schematic diagram depicting a water temperature control system as utilized in the method of the present invention.

More particularly, referring to FIG. 1 the temperature control system 10 of the present invention is shown as utilized in conjunction with a heat load 12 such as, for example, an accelerator waveguide section, a klystron tube, or a length of waveguide. A holding vessel 14 of predetermined shape and size, which contains a supply of coolant, viz., water 13 is serially connected from its upper and lower ends across the heat load 12 by a suitable assemblage of pipes or conduit, herein depicted as return pipe 15 and exit pipe 17 respectively. A water circulating pump 16 is inserted in the exit pipe 17, and maintains the flow of water 13 through the heat load. A back-pressure control valve 18 is disposed in the return pipe 15 to maintain a lower pressure in the vessel 14 than that pressure existing in the region of the heat load 12. The return pipe 15 is connected within the vessel 14 preferably to a spreader plate 20, which tends to scatter the returning water to facilitate vaporization thereof by exposing the returning water to more intimate contact with the vapor region above the level of the water 13. It is to be noted that various other means may be utilized in place of plate 20 to spread the incoming coolant; e.g., spraying the coolant into the vessel, or overflowing the coolant from an internal standpipe.

A water vapor condenser 22 is connected at its lower end to the holding vessel 14 at a point thereof above the level of the water 13 therein. A cooling fluid supply 23 is connected by suitable pipes to a cooling coil (not shown) within the condenser 22. Circulating the relatively cool fluid from the fluid supply 23 through the coil in the condenser 22 causes the incoming flashed water vapor to condense and thus acquire the desired, predetermined temperature of the water 13 within the vessel. Thus, heat removed from the heat load 12 by the water is dissipated. From the condenser 22 water is returned to the holding vessel 14 preferably by gravity flow.

The size of condenser 22 will remain the same for a given heat load for a relatively large range of coolant circulating rates within the system. Such advantageous condition is made possible since the amount of vapor produced is dependent only on the amount of heat dissipated and not upon the quantity of coolant circulated. Accordingly, this system can be operated at a high rate of coolant circulation with only a small attendant increase in the temperature of the coolant, and utilizing the same condenser 22. This is unlike a liquid-to-liquid heat exchanger wherein a large increase in the rate of coolant circulation in the system would generally require a larger heat exchanger and larger capacity transfer pipes if the increase in coolant temperature were to be kept small and the system pressure maintained at the same value. It is to be understood, however, that if the temperature of the heat load is drastically increased, a change in the size of condenser 22 may be necessary. For example, if the rate is increased to the point that condensing of the vapor is taking place at the top of the condenser 22, fluid or vapor will be introduced to the vacuum pumping system described infra impairing the operation thereof, and it would be necessary to install a condenser 22 having a larger capacity.

A vacuum pump 24 is connected to the coolant vapor condenser 22 via a cold trap 26 and a throttling control valve 28. The vacuum pump 24 maintains the desired pressure within the system, viz., condenser 22 and interconnected vessel 14. The cold trap 26, disposed in the vacuum line between the condenser 22 and the vacuum pump 24, reduces to a minimum value the coolant losses to the vacuum pump 24, thereby providing a system which is self-contained. A pressure cell 30 which measures absolute pressure values is coupled to the volume within vessel 14 at a position above the level of the water 13 therein, and provides means for sensing the pressure in the vessel 14. A valve control apparatus 32 is connected from the pressure cell 30 to the control valve 28 and provides means for activating the control valve 28 in relation to the pressure sensed by the pressure cell 30, to thereby establish and maintain a preselected pressure in the vessel 14. A by-pass valve 34 is connected across the control valve 28 by suitable vacuum lines. Accordingly, it may be seen that pressure cell 30, valve control apparatus 32, control valve 28, bypass valve 34, and back-pressure control valve 18 form in combination an absolute pressure control means (in combination with the vacuum pump 24) which establishes and maintains the system pressure, and particularly the pressure in vessel 14, to within a fraction of a mm. Hg. Bypass valve 34 makes possible the changing and control of pressure in either the vessel 14 or condenser 22 as desired, while also allowing for quicker pumpdown of the system. An air-bleed valve 35 is connected to the vacuum line in the region between the control valve 28 and condenser 22.

The concept of the present invention is based on the fact that the pressure-temperature-volume relationship of pure water is known to great accuracy, and proper control of the absolute pressure will fix the temperature of the water very accurately. Using such principle, the pressure within the holding vessel 14 is precisely adjusted so that the coolant viz., water, boils at the same temperature as the temperature selected for the circulating coolant, i.e., the desired regulating temperature of the heat load 12. At such time as the water reaches the desired temperature, it is circulated by means of pump 16 through the exit pipe 17, and through the heat load 12 to absorb and retain the heat emitted thereby. The circulating water is then passed through valve 18 and pipe 15, and is returned to the holding vessel 14 at a higher temperature than that of the water in the vessel 14. The temperature of the water already in the vessel 14 is assumed at this time to be stable and adjusted to its boiling temperature.

To dissipate the heat absorbed by the water from the heat load 12, the returning heated water is injected into the top of the vessel 14 and against the spreader plate 20. As previously noted, a controlled pressure has been established within the vessel 14 which is lower than that pressure existing in the region of the heat load 12. The heat removed by the returning water is absorbed by the generation of vapor whereby the temperature of the emerging water drops to the temperature value of the water 13 in the vessel 14. Thus it may be seen that the amount of vapor generated is directly proportional to the amount of heat removed from the heat load 12. It is obvious that the vapor generation should occur before the incoming water mixes with the water already in the holding vessel 14, otherwise the stability and the uniformity of the water in the vessel, in equilibrium at the boiling temperature, would be altered. In general, the water does rapidly drop to the controlled temperature. To facilitate the production of vapor, the returning coolant is spread or showered to cause more intimate contact with the vapor of said coolant which is in the vessel in the region above the coolant level.

The water vapor generated in the upper portion of the vessel 14 is thereupon introduced to the condenser 22 through a suitable interconnecting pipe, wherein it is condensed by means of a cooling coil supplied with a relatively lower temperature fluid from fluid supply 23. The vapor condenses within condenser 22 and is returned by gravity flow to the vessel 14 at the temperature of the boiling water 13.

The cooling system herein described is in essence a closed system; that is, the coolant is in contact only with its own vapor while being continuously circulated and vaporized. Therefore, carbon dioxide and oxygen, as well as any dissolved gases, are inherently removed and subsequently precluded from the cooling system. Thus, there is no need for auxiliary apparatus and/or the addition of various chemical constituents, in order to preclude the corrosive effects generally attributed to the presence of oxygen or other gases; such effects being prevalent in conventional heat-exchanger cooling systems. Thus, the present invention with a minimum of apparatus not only cools a heat load to extreme accuracies, but further inherently precludes the corrosive effects of oxygen or other gases in the circulating coolant.

Figure 2:
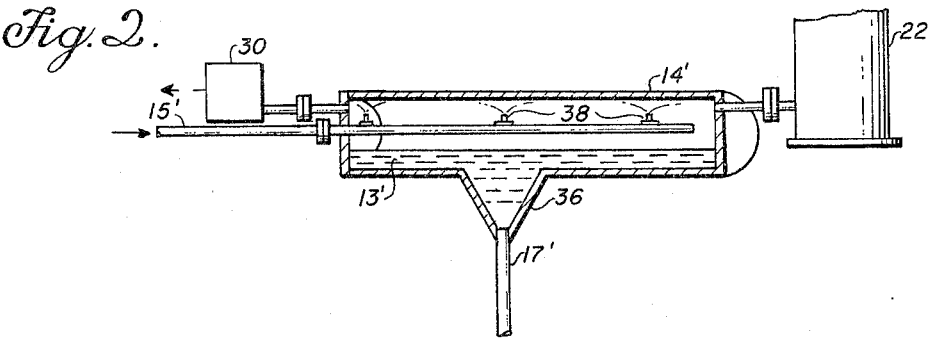
FIGURE 2 is an alternative embodiment of a portion of the invention apparatus, specifically designed to allow rapid adjustment of the system regulating temperature.

As per previous mention, an alternative method of spreading the incoming coolant within the vessel 14 consists of spraying the coolant into the vessel. Referring to FIG. 2 an alternative embodiment of the invention, and in particular, of the holding vessel 14 of FIG. 1 is shown. The alternative vessel 14', comprising an elongated cylinder of relatively small cross section such as shown in FIG. 2, is particularly adapted to decrease the holdup time of the circulating coolant 13' contained therein, from on the order of minutes to the order of a few seconds. The decrease of holdup time provides for rapid adjustment of the coolant regulating temperature to a new temperature setting, as may be desired. Although not herein shown, the new setting may be made by manual or automatic means. For example, if an automatic means is utilized such would comprise a temperature sensing device located on the equipment to be cooled, e.g., the heat load 12. Accordingly, upon sensing an operating change, i.e., a temperature variation, in the heat load 12, an air signal is generated by the temperature sensing device connected thereto. This signal is fed into an additional circuit which, in turn, combines the signal with an air signal from the pressure-sensing cell 30, and transmits the combined signals to the control valve 28, whereby a corresponding change is made in the vessel pressure.

Regarding the coolant holding vessel 14' of FIG. 2, in order to provide a decreased holdup time for coolant circulation, an axially elongated cylindrical or a rectangular elongated tank of relatively small cross-section is utilized. An exit pipe 17' is herein depicted in conjunction with a funnel-shaped trap 36 to provide apparatus which drains the water downwardly from the vessel 14'. Return pipe 15' is introduced through the wall of the vessel 14', with a suitable seal and orientation, and extends inwardly therein along the length thereof. A plurality of spray nozzles 38 are connected to the length of the pipe within vessel 14', and are disposed to spray the incoming coolant upwardly against the wall of the vessel 14' to provide an optimum vaporizing condition.

There are likewise other alternative apparatus which can be used in place of portions of the system 10 of the present invention. For example, the vacuum pump 24 could be replaced by any other means by which a vacuum may be effected such as, for example, a jet stream apparatus. The cooling fluid supply 23 may be any source of cooling fluid, generally water, such as supplied by a cooling water tower system, etc. However, the temperature of the cooling fluid passed through the coil within the condenser 22 must be lower than the condensing temperature of the coolant vapor being introduced thereto from the vessel 14 (14').

Likewise, although the use of the pressure cell 30 in combination with the valve control apparatus 32 for precisely controlling the pressure within the vessel 14 is preferable, an alternative apparatus for accomplishing essentially the same result in a slightly less efficient manner comprises a temperature sensing device 33 (FIG. 3) inserted through the wall of the vessel 14 (14') and into the coolant 13 (13') therein. Such temperature sensing device 33 initiates an air signal which is, in essence, the measure of the ambient pressure within the vessel 14. The signal is received and relayed by a transmitting device 32' such as the control valve apparatus 32 of FIG. 1, to the control valve 28 to thereby adjust the valve opening in a manner heretofore described, and thus adjust the pressure within the apparatus of the system 10 in relation to the desired operating conditions.

The back-pressure valve 18 may be simply an orifice or a smaller diameter length of pipe. That is, any means may be employed to restrict the passage of coolant therethrough, and thus cause a condition of relatively lower pressure in the vessel 14. However, more exact and efficient control can be obtained by using a variable valve as shown.

The cold-trap 26 comprises an auxiliary piece of apparatus utilized to prevent the introduction of any steam or fluid from the condenser 22 to the vacuum pump 24 should the condenser approach its maximum operating capacity. Likewise, the bypass valve 34 constitutes an auxiliary piece of apparatus utilized to aid in pumping down the cooling system 10 while further making it possible to effect a change in pressure within the system at the desired location. The air-bleed valve 35 also is employed in its particular location in the system to effect a more accurate operation of the system without impairing the removal of gases from the system or increasing the oxygen content of the coolant. Furthermore, the air-bleed valve 35 provides a means for quicker, more accurate system response when changing from one regulating temperature to another.

In a closed cycle, cooling system such as described in FIGS. 1 and 2, there is very little coolant loss and thus there is little need for a means or apparatus for maintaining the liquid level in vessel 14 constant by introducing fresh coolant thereto. However, in alternative embodiments of the invention, such as for example, the embodiment utilizing liquid nitrogen, wherein the coolant is vented to air, it is necessary to replace the coolant discharged as vapor. Referring to FIG. 3 a liquid level control means 40 comprises a solenoid valve 42 which is coupled to an exterior coolant supply 44, and which has a liquid-level sensing means 46, e.g., a float, coupled thereto. The level control means 40 is mounted to the vessel 14 and extends therein to sense the liquid level therein and introduce fresh coolant from the exterior coolant supply 44 at such time as the liquid in the vessel drops below a preselected level. Thus the liquid level control means 40 provides for adjustably introducing a flow of coolant in the liquid state to the vessel 14 to maintain the quantity of coolant in liquid state at substantially a preselected amount.

The following material exemplifies the equipment and operating parameters of the embodiment shown in FIG. 1, which was constructed and satisfactorily operated to cool and regulate the operating temperature of a disk-loaded waveguide at 113° F. with a water coolant flow rate of about 13 gal./min. The heat efflux removed from the waveguide approximated 12 kilowatts and was selectively varied in the range from 5 to 15 kilowatts for test purposes. The absolute pressure maintained within the vessel was 72 mm. Hg, controlled to within ±¼ mm. Hg.

The vacuum pump 24 was a "Welch" vacuum pump, of the oil-bath type utilizing an eccentrically mounted rotor within a stator and provided with two metal vanes which move in and out of respective slots in the revolving rotor to press constantly against the stator wall. The pump has a pumping capacity of the order of 1½ c.f.m.

The pressure sensing cell 30 was a "Foxboro" absolute pressure sensing device having a range of from 0–100 mm. Hg, and of the type utilizing a diaphragm wherein one side thereof is exposed to the pressure condition which is to be regulated, and the other side is pumped to approximately 1 micron pressure (corresponding to zero pressure). As variations in pressure occur in the vessel, the diaphragm fluctuates to cause corresponding variations in an air signal metered from an outside source. The air signal is transmitted to the valve 28 by means of an air line coupled from the pressure sensing cell 30 to the valve control apparatus 32.

The valve control apparatus 32 was a "Foxboro" pressure transmitter which received the air signal sensed by the diaphragm of the cell 30, and compares the signal with a preselected air valve set thereon. A higher or lower incoming air signal from cell 30 causes thus a resulting air signal of corresponding value to be transmitted to the control valve 28 by way of an interconnecting air line thereto.

The control valve 28 was a "Foxboro" pneumatic-operated diaphragm throttling valve using 3–15 pounds air signal, and of the type having a diaphragm integrally connected to a floating plug. The diaphragm has one side thereof exposed to the incoming air signal from the valve control apparatus 32, whereby motion relative to the air signal is provided to the diaphragm and integrally connected plug to thereby correspondingly vary the valve 28 opening. The control valve utilized was of ½ inch body size with a minimum opening installed therein.

The coolant pump 16 was a conventional "Chempump" centrifugal pump of the "canned" type having a capacity of about 30 gal./min., and which utilizes a configuration wherein the rotor is mounted within the pumped stream of liquid thus precluding the necessity of shaft seals.

The system as constructed with the above noted parameters successfully maintained the temperature of the disk-loaded waveguide to within 0.2° F. of the 113° F. temperature, even during fairly rapid fluctuations of the waveguide temperature.

While the invention has been disclosed with respect to a first and several alternative embodiments, it will be apparent to those skilled in the art that numerous variations and modifications may be made within the spirit and scope of the invention, and thus it is not intended to limit the invention except as defined by the following claims.

What is claimed is:
1. A closed cooling system for cooling and maintaining a heat load at a predetermined temperature, comprising:
   a heat-emitting object connected as a heat load within said system;
   a vessel apart from said heat-emitting object and forming a part of said closed system;
   a coolant contained within said vessel, said coolant partially filling said vessel in substantially liquid state and the remainder of the vessel in substantially vapor state;
   a heat-transfer circuit including a first conduit communicating with the liquid-filled portion of said vessel for passing said liquid coolant from said vessel into heat-transfer relationship with said heat-emitting object to absorb heat therefrom, thereby heating the coolant while in heat-transfer relationship with the heat-emitting object, and a second conduit for passing the heated coolant from said relationship with said heat-emitting object into the vapor-filled portion of said vessel;
   means for scattering said heated liquid coolant throughout the vapor-filled portion of said vessel so that vapor is evolved therefrom; and
   adjusting means communicating with the vapor-filled portion of said vessel for maintaining the vapor pressure of the coolant therein substantially fixed at a level at which the boiling point of said coolant corresponds to said predetermined temperature so that the heat content of the vapor evolved from the scattered coolant in the vapor-filled portion of the vessel is substantially equivalent to the heat absorbed by the coolant from the heat-emitting object.

2. A cooling system according to claim 1 wherein said heat-transfer circuit includes pressure means associated with said first conduit for pressurizing said liquid coolant while in heat-transfer relationship with said heat-emitting object, and said second conduit includes flow control means associated therewith, said pressure means and flow control means cooperating to maintain the liquid coolant in contact with said heat-emitting object at a pressure above the boiling point therein and which is above the boiling point of the liquid in said vessel.

3. A cooling system according to claim 1 wherein said adjusting means includes a vacuum pump; means for sensing changes in pressure of the contents of the vapor-filled portion of said vessel; and means responsive to said sensing means upon sensing an increase of pressure of the contents of the vapor-filled portion of said vessel above a predetermined level for connecting said vacuum pump into said system to lower the pressure therein, said responsive means being under control of said sensing means, upon sensing a return of said pressure to said predetermined level, to disconnect said vacuum pump from said system.

4. A cooling system according to claim 1 wherein said adjusting means includes:
   an outlet from the vapor-filled portion of said vessel;
   a normally closed device external to said vessel and connected to said outlet for receiving the vaporized coolant from said vessel; and
   means for dissipating heat from said external device to cause liquefaction of said vaporized coolant for return to the liquid-filled portion of said vessel, said liquefaction causing a differential pressure between said vessel and said external means to cause movement of vapor from said vessel to said external device for continuous liquefaction therein at a rate equal to the transfer of heat from said heat-emitting object to said liquid coolant.

5. A cooling system according to claim 1 wherein said adjusting means comprises:
   a device external to said vessel and having a chamber with an inlet and an outlet, said inlet being connected with the vapor-filled portion of said vessel to permit movement of vaporized coolant into said chamber;
   means for dissipating heat from said device to cause liquefaction of said vaporized coolant within said chamber, said liquefaction causing a differential pressure between said vessel and said chamber to cause movement of vaporized coolant from said vessel into said chamber for liquefaction therein at a rate equal to the transfer of heat from said heat-emitting object to said liquid coolant;
   a vacuum pump;
   means for sensing a change in pressure of the vapor-filled portion of said vessel upon vaporization of a greater amount of coolant than is liquefied by said cooling means; and
   means responsive to said sensing means, upon sensing an increase of pressure of the vapor-filled portion of said vessel above a predetermined level, for connecting said vacuum pump to said outlet for evacuation of said system to lower the pressure to said predetermined level, said responsive means being under control of said sensing means to disconnect said vacuum pump from said system upon sensing a return of the pressure of the vapor-filled portion of said vessel to said predetermined level.

6. A method for cooling and maintaining the temperature of a heat-emitting object at a predetermined temperature, comprising the steps of:

filling a portion of a closed vessel with a liquid coolant having said predetermined temperature and filling the remainder of the vessel with vapors of said coolant at a predetermined pressure;

circulating said liquid coolant under pressurized condition from the liquid-filled portion of said vessel into heat-transfer relationship with said object to absorb heat therefrom and back to the vapor-filled portion of said vessel;

scattering said heated liquid coolant throughout the vapor-filled portion of said vessel so that vapor is evolved therefrom to carry off an amount of heat equivalent to the heat absorbed by the coolant from the object; and maintaining the vapor-pressure of the coolant in the vessel substantially fixed at a level at which the boiling point of the coolant corresponds to said predetermined pressure.

7. The method of claim 6 wherein the pressure applied to the coolant while in heat-transfer relationship with said object is at a level to maintain the boiling point of the liquid coolant above the temperature attained by absorption of heat from said object.

8. The method of claim 6 wherein the step of maintaining a substantially fixed vapor pressure includes the steps of:

sensing a change in pressure within said vessel;

pumping vapor from the vessel upon sensing an increase of pressure within said vessel above a predetermined level; and stopping said pumping upon sensing a return of the pressure within said vessel to said predetermined level.

9. The method of claim 6 wherein the step of maintaining a substantially fixed vapor pressure of said coolant includes the steps of:

conducting the vapors of said coolant into a chamber which is external to said vessel and which forms a part of said closed system; and continuously cooling the vapors within said chamber to the point of liquefaction at a rate equal to the transfer of heat from said object to said liquid coolant.

10. The method of claim 6 wherein the step of maintaining a substantially fixed vapor pressure includes the steps of:

conducting the vapors of said coolant into a chamber which is external to said vessel and which forms a part of said closed system;

progressively cooling the vapors as they enter the chamber so that the coolest vapors are furthest from the point of entry, said progressive cooling causing liquefaction of the vapors;

sensing a change in pressure of the vapor-filled portion of said vessel above a predetermined level;

pumping the coolest vapors from said chamber upon sensing an increase of pressure within the vapor-filled portion of said vessel; and stopping said pumping upon sensing a return of the pressure within said vessel to said predetermined level.

References Cited by the Examiner

UNITED STATES PATENTS

| 1,762,762 | 6/1930 | Coffey | 62—310 |
| 2,292,946 | 8/1942 | Karig | 165—107 |
| 2,363,118 | 11/1944 | Chamberlain | 165—105 |
| 2,541,861 | 2/1951 | Chambers | 62—310 |
| 2,924,635 | 2/1960 | Narbut | 165—105 |

FOREIGN PATENTS 884,950    5/1943    France.

ROBERT A. O'LEARY, *Primary Examiner.*

N. R. WILSON, *Assistant Examiner.*